(12) United States Patent
Du et al.

(10) Patent No.: US 12,224,925 B2
(45) Date of Patent: Feb. 11, 2025

(54) SRV6-BASED DATA PROCESSING METHOD AND RELATED NETWORK DEVICE

(71) Applicant: Huawei Technologies Co., Ltd., Shenzhen (CN)

(72) Inventors: Zongpeng Du, Shenzhen (CN); Jie Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 676 days.

(21) Appl. No.: 17/500,142

(22) Filed: Oct. 13, 2021

(65) Prior Publication Data

US 2022/0038364 A1 Feb. 3, 2022

Related U.S. Application Data

(63) Continuation of application No. PCT/CN2020/081127, filed on Mar. 25, 2020.

(30) Foreign Application Priority Data

Apr. 15, 2019 (CN) .......................... 201910302379.4

(51) Int. Cl.
*H04L 45/02* (2022.01)
*H04L 45/00* (2022.01)
(Continued)

(52) U.S. Cl.
CPC .............. *H04L 45/02* (2013.01); *H04L 45/34* (2013.01); *H04L 45/50* (2013.01); *H04L 45/74* (2013.01)

(58) Field of Classification Search
CPC ......... H04L 45/02; H04L 45/34; H04L 45/50; H04L 45/74; H04L 47/365; H04L 45/121;
(Continued)

(56) References Cited

U.S. PATENT DOCUMENTS

2017/0237656 A1 8/2017 Gage et al.
2019/0159027 A1 5/2019 Kuge et al.
(Continued)

FOREIGN PATENT DOCUMENTS

CN 108886757 A 11/2018
WO 2019001350 A1 1/2019

OTHER PUBLICATIONS

Dong Jie: "SRv6 based Network Slicing Contents", MPLS + SON + NFWORLD PARIS 2019, Apr. 9, 2019(Apr. 9, 2019), XP055909387, Retrieved from the Internet:URL:https://www.ipv6plus.net/resources/VTN/SRv6-basedNetwork-Slicing_MPLS-Congress-2019.pdf.
(Continued)

*Primary Examiner* — Ivan O Latorre
(74) *Attorney, Agent, or Firm* — Conley Rose, P.C.

(57) ABSTRACT

A Segment Routing over Internet Protocol version 6 (SRv6)-based data processing method includes a first network device generating a slice locator, where the slice locator includes a target argument. The slice locator is used to identify an addressable destination address prefix in a slice supported by the first network device, and the target argument is used to indicate that the slice locator is associated with at least two slices supported by the first network device. The first network device sends the slice locator to a second network device, so that the second network device generates, based on the slice locator, at least two target slice locators corresponding to the at least two slices.

25 Claims, 10 Drawing Sheets

(51) Int. Cl.
*H04L 45/50* (2022.01)
*H04L 45/74* (2022.01)

(58) Field of Classification Search
CPC .............. H04L 45/748; H04L 61/5007; H04L 2101/659; H04L 45/12; H04L 47/17
See application file for complete search history.

(56) References Cited

U.S. PATENT DOCUMENTS

2020/0245296 A1\* 7/2020 Kimura ................. H04L 45/745
2022/0045944 A1\* 2/2022 Sun ....................... H04L 5/0058

OTHER PUBLICATIONS

"Updates for SRv6 for Mobile User-Plane",3GPP DRAFT;C4-176177-SRV6-Mobile-Uplane-Updates, 3rdgeneration Partnership Project (3GPP), Mobilecompetence Centre ; 650, Route Des Lucioles ;F-06921 Sophia-Antipolis Cedex ; FRANCE, Nov. 17, 2017 (Nov. 17, 2017), XP051368364, Retrieved from the Internet: URL:http://www.3gpp.org/ftp/tsg%5Fct/WG4%5Fprotocollars%5Fex%2DCN4/TSGCT 4% 6F81 %5FReno/Docs/ [retrieved on Nov. 17, 2017].
3GPP TR 29.892 V0.3.0, "3rd Generation Partnership Project; Technical Specification Group Core Network and Terminals; Study on User Plane Protocol in 5GC (Release 16)," Oct. 2018, 20 pages.
Psenak, P., Ed., et al., "IS-IS Extensions to Support Routing over IPv6 Dataplane," draft-bashandy-isis-srv6-extensions-04.txt, Oct. 15, 2018, 21 pages.
SoftBank Corp., et al., "Pseudo-CR on SRv6 User Plane Principle for 5GC," 3GPP TSG-CT WG4 Meeting #89, C4-190267, Montreal, Canada; Feb. 25-Mar. 1, 8 pages.

\* cited by examiner

SRV6-BASED DATA PROCESSING METHOD AND RELATED NETWORK DEVICE

CROSS-REFERENCE TO RELATED APPLICATIONS

This is a continuation of International Patent Application No. PCT/CN2020/081127 filed on Mar. 25, 2020, which claims priority to Chinese Patent Application No. 201910302379.4 filed on Apr. 15, 2019, both of which are incorporated herein by reference in their entireties.

TECHNICAL FIELD

This application relates to the communications field, and in particular, to a Segment Routing over Internet Protocol version 6 (SRv6)-based data processing method and a related network device.

BACKGROUND

Currently, a segment routing (SR) technology that is simpler and easier to use is innovated based on Multi-Protocol Label Switching (MPLS). The SR technology is essentially a source routing technology that can specify a node and a path through which a packet carrying a segment identifier (SID) list passes, to meet a traffic optimization requirement. The SR technology applied to an Internet Protocol version 6 (IPv6) network is called SRv6.

As a widely discussed technology in fifth generation (5G), network slicing is of great significance to 5G. In other approaches in which SRv6 may be combined with network slicing, different SIDs are allocated to different slices, to guide slice traffic forwarding and ensure that slice traffic does not affect each other. In an SRv6 network, before an SID is configured, a node in the network is further configured with a locator for each slice. Locators correspond to IPv6 prefixes of SRv6 SIDs. After the foregoing configuration is completed, each node in each slice in the network has an own locator. In this way, when slice traffic forwarding is implemented, slice resources corresponding to a device can be isolated from each other by using the SID corresponding to each slice.

However, in this solution, a network device needs to publish a locator corresponding to each slice. In this case, when a quantity of slices is relatively large, a large quantity of locators need to be published, and an operation is relatively complex.

SUMMARY

Embodiments of this application provide an SRv6-based data processing method, to implement that when supporting a relatively large quantity of slices, a first network device does not need to send a large quantity of slice locators. This simplifies an operation.

In view of this, a first aspect of this application provides an SRv6-based data processing method, including: A first network device generates a slice locator, where the slice locator includes a target argument, the slice locator is used to identify an addressable destination address prefix in a slice supported by the first network device, and the target argument is used to indicate that the slice locator is associated with at least two slices supported by the first network device; and the first network device sends the slice locator to a second network device, so that the second network device generates, based on the slice locator, at least two target slice locators corresponding to the at least two slices.

In the foregoing manner, because the target argument is added to the slice locator generated by the first network device, and the target argument indicates that the slice locator is associated with a plurality of slices, the first network device may only publish one slice locator. The network device that receives the slice locator generates, based on an indication of the target argument, target slice locators whose quantity is equal to a quantity of slices, which may achieve a same effect as that achieved when the first network device sends slice locators whose quantity is equal to the quantity of slices. Therefore, when supporting a relatively large quantity of slices, the first network device does not need to send a large quantity of slice locators. This simplifies an operation.

Optionally, in a possible implementation of the first aspect, the target argument includes slice information, and the slice information includes a quantity of slices supported by the first network device and identifiers of the slices.

In the foregoing manner, the second network device that receives the slice locator may learn of, based on the slice information in the target argument, the quantity of slices supported by the first network device and an identifier of each slice, so that the second network device generates a target slice locator corresponding to each slice supported by the first network device.

Optionally, in a possible implementation of the first aspect, a format of the slice locator is a first type-length-value (TLV), a format of the target argument includes a first sub-TLV belonging to the first TLV, the first sub-TLV indicates a size and a location of the target argument, and the first sub-TLV may belong to a top TLV 27 in the Intermediate System to Intermediate System (IS-IS) protocol.

In the foregoing manner, a specific format of the slice locator is provided, that is, the slice locator may be in a TLV format, the target argument is a sub-TLV belonging to the slice locator, and the slice locator may be published in the top TLV 27 in the IS-IS protocol. This improves practicability of this solution.

Optionally, in a possible implementation of the first aspect, the format of the target argument further includes a second sub-TLV belonging to the first TLV, and the second sub-TLV is used to indicate the slice information.

In the foregoing manner, a part that is in the target argument and that is used to indicate the slice information may alternatively be a sub-TLV belonging to the slice locator, and the first sub-TLV and the second sub-TLV may be distinguished by using type identifiers. This improves scalability of this solution.

Optionally, in a possible implementation of the first aspect, that the first network device sends the slice locator to a second network device includes: The first network device sends a physical topology locator to the second network device, where the physical topology locator includes the slice locator, and the physical topology locator is used to identify an addressable destination address prefix in a physical topology.

In the foregoing manner, an implementation in which the first network device publishes the slice locator is provided, that is, the first network device may publish the slice locator as a subset of the physical topology locator. It may be understood that the first network device may alternatively send the slice locator and the physical topology locator separately. This improves flexibility of this solution.

Optionally, in a possible implementation of the first aspect, the method further includes: The first network device sends a slice function corresponding to the slice locator to the second network device, where the slice function is used to indicate an instruction set by the first network device.

In the foregoing manner, because the slice locator and the function together form an SID, the first network device further needs to send the function corresponding to the slice locator to the second network device. Correspondingly, the second network device may generate a target function corresponding to each slice supported by the first network device. This improves integrity of this solution.

Optionally, in a possible implementation of the first aspect, the slice function includes an End function, where the End function is used to identify node information of the first network device.

Optionally, in a possible implementation of the first aspect, the slice function includes N End.X functions, where the N End.X functions are used to identify N links supported by the first network device, and N is an integer greater than or equal to 1.

In the foregoing manner, scenarios in which a function is an End function and a function is an End.X function in this solution are listed. This further improves integrity of this solution.

Optionally, in a possible implementation of the first aspect, a format of the End function is a third sub-TLV belonging to the first TLV.

Optionally, in a possible implementation of the first aspect, a format of the End.X function is a fourth sub-TLV belonging to a second TLV, and the second TLV belongs to a top TLV 22, a top TLV 23, a top TLV 222, a top TLV 223, or a top TLV 141 in the IS-IS protocol.

Optionally, in a possible implementation of the first aspect, the fourth sub-TLV includes a first sub-sub-TLV, and the first sub-sub-TLV indicates the size and the location of the target argument.

Optionally, in a possible implementation of the first aspect, the fourth sub-TLV includes a second sub-sub-TLV, and the second sub-sub-TLV indicates the slice information.

In the foregoing manner, specific format types of the End function and the End.X function are provided. This further improves practicability of this solution.

A second aspect of this application provides an SRv6-based data processing method, including: A second network device receives a slice locator from a first network device, where the slice locator includes a target argument, the slice locator is used to identify an addressable destination address prefix in a slice supported by the first network device, and the target argument is used to indicate that the slice locator is associated with at least two slices supported by the first network device; the second network device generates, based on the slice locator, at least two target slice locators corresponding to the at least two slices; and the second network device generates X forwarding entries based on the at least two target slice locators, where X is an integer greater than or equal to 1, and X is less than or equal to a quantity of target slice locators.

In the foregoing manner, because the target argument is added to the slice locator generated by the first network device, and the target argument indicates that the slice locator is associated with a plurality of slices, the first network device may only publish one slice locator. The second network device that receives the slice locator generates, based on an indication of the target argument, target slice locators whose quantity is equal to a quantity of slices, which may achieve a same effect as that achieved when the first network device sends slice locators whose quantity is equal to the quantity of slices. Similarly, the second network device may serve as a network device that publishes the slice locator. To be specific, each network device in a slice network may only publish one slice locator, and does not need to publish a slice locator corresponding to each slice. This simplifies an operation.

Optionally, in a possible implementation of the second aspect, a format of the slice locator is a first type-length-value TLV, a format of the target argument is a first sub-TLV belonging to the first TLV, the first sub-TLV indicates a size and a location of the target argument, and the first sub-TLV belongs to a top TLV 27 in the IS-IS protocol.

Optionally, in a possible implementation of the second aspect, that the second network device generates, based on the slice locator, at least two target slice locators corresponding to the at least two slices includes: The second network device obtains slice information from slice topology information based on an indication of the target argument, where the slice information includes a quantity of slices supported by the first network device and identifiers of the slices; and the second network device generates the at least two target slice locators based on the slice information.

In the foregoing manner, a specific implementation in which the second network device generates the target slice locator is provided. To be specific, the second network device may learn of, based on the slice topology information, the quantity of slices supported by the first network device and an identifier of each slice, to generate a target slice locator corresponding to each slice supported by the first network device. This improves feasibility of this solution.

Optionally, in a possible implementation of the second aspect, the format of the target argument further includes a second sub-TLV belonging to the first TLV, the second sub-TLV is used to indicate slice information, and the slice information includes a quantity of slices supported by the first network device and identifiers of the slices; and that the second network device generates, based on the slice locator, at least two target slice locators corresponding to the at least two slices includes: that the second network device generates, based on the slice locator, at least two target slice locators corresponding to the at least two slices includes: the second network device generates the at least two target slice locators based on the slice information.

In the foregoing manner, another specific implementation in which the second network device generates the target slice locator is provided. To be specific, the second network device may learn of, based on the slice information carried in the target argument, the quantity of slices supported by the first network device and an identifier of each slice, to generate a target slice locator corresponding to each slice supported by the first network device. This improves flexibility of this solution.

Optionally, in a possible implementation of the second aspect, that the second network device generates X forwarding entries based on the at least two target slice locators includes: the second network device obtains, from the at least two slices corresponding to the at least two target slice locators, X slices to which the second network device belongs; and the second network device generates the X forwarding entries corresponding to the X slices.

In the foregoing manner, the second network device generates a target slice locator corresponding to each slice supported by the first network device. However, the second network device may select a slice to which the second network device belongs and generate a forwarding entry corresponding to the slice. The second network device may not generate a forwarding entry corresponding to a slice to which the second network device does not belong. This reduces an unnecessary operation.

Optionally, in a possible implementation of the second aspect, the method further includes: the second network device receives a slice function from the first network device, where the slice function is used to indicate an instruction set by the first network device.

Optionally, in a possible implementation of the second aspect, the slice function includes an End function, where the End function is used to identify node information of the first network device.

Optionally, in a possible implementation of the second aspect, the slice function includes N End.X functions, where the N End.X functions are used to identify N links supported by the first network device, and N is an integer greater than or equal to 1.

A third aspect of this application provides a first network device, including: a processing unit, configured to generate a slice locator, where the slice locator includes a target argument, the slice locator is used to identify an addressable destination address prefix in a slice supported by the first network device, and the target argument is used to indicate that the slice locator is associated with at least two slices supported by the first network device; and a sending unit, configured to send the slice locator to a second network device, so that the second network device generates, based on the slice locator, at least two target slice locators corresponding to the at least two slices.

Optionally, in a possible implementation of the third aspect, the target argument includes slice information, and the slice information includes a quantity of slices supported by the first network device and identifiers of the slices.

Optionally, in a possible implementation of the third aspect, a format of the slice locator is a first type-length-value TLV, a format of the target argument includes a first sub-TLV belonging to the first TLV, and the first sub-TLV indicates a size and a location of the target argument.

Optionally, in a possible implementation of the third aspect, the format of the target argument further includes a second sub-TLV belonging to the first TLV, and the second sub-TLV is used to indicate the slice information.

Optionally, in a possible implementation of the third aspect, the sending unit is specifically configured to send a physical topology locator to the second network device, where the physical topology locator includes the slice locator, and the physical topology locator is used to identify an addressable destination address prefix in a physical topology.

Optionally, in a possible implementation of the third aspect, the sending unit is further configured to send a slice function corresponding to the slice locator to the second network device, where the slice function is used to indicate an instruction set by the first network device.

A fourth aspect of this application provides a second network device, including: a receiving unit, configured to receive a slice locator from a first network device, where the slice locator includes a target argument, the slice locator is used to identify an addressable destination address prefix in a slice supported by the first network device, and the target argument is used to indicate that the slice locator is associated with at least two slices supported by the first network device; and a processing unit, configured to generate, based on the slice locator, at least two target slice locators corresponding to the at least two slices, where the processing unit is further configured to generate X forwarding entries based on the at least two target slice locators, where X is an integer greater than or equal to 1, and X is less than or equal to a quantity of target slice locators.

Optionally, in a possible implementation of the fourth aspect, a format of the slice locator is a first type-length-value TLV, a format of the target argument is a first sub-TLV belonging to the first TLV, the first sub-TLV indicates a size and a location of the target argument, and the first sub-TLV belongs to a top TLV 27 in the intermediate system to intermediate system IS-IS protocol.

Optionally, in a possible implementation of the fourth aspect, the processing unit is specifically configured to: obtain slice information from slice topology information based on an indication of the target argument, where the slice information includes a quantity of slices supported by the first network device and identifiers of the slices; and generate the at least two target slice locators based on the slice information.

Optionally, in a possible implementation of the fourth aspect, the format of the target argument further includes a second sub-TLV belonging to the first TLV, the second sub-TLV is used to indicate slice information, and the slice information includes a quantity of slices supported by the first network device and identifiers of the slices; and the processing unit is specifically configured to generate the at least two target slice locators based on the slice information.

Optionally, in a possible implementation of the fourth aspect, the processing unit is specifically configured to: obtain, from the at least two slices corresponding to the at least two target slice locators, X slices to which the second network device belongs; and generate the X forwarding entries corresponding to the X slices.

Optionally, in a possible implementation of the fourth aspect, the receiving unit is further configured to: receive a slice function from the first network device, where the slice function is used to indicate an instruction set by the first network device.

A fifth aspect of this application provides a first network device, including a processor and a memory. The memory stores program code, and when invoking the program code in the memory, the processor performs the method in any one of the optional implementations of the first aspect.

A sixth aspect of this application provides a second network device, including a processor and a memory. The memory stores program code, and when invoking the program code in the memory, the processor performs the method in any one of the optional implementations of the second aspect.

A seventh aspect of this application provides a computer-readable storage medium including instructions. When the instructions are run on a computer, the computer is enabled to perform the method in any one of the optional implementations of the first aspect and the method in any one of the optional implementations of the second aspect.

An eighth aspect of this application provides a computer program product. When the computer program product is run on a computer, the computer is enabled to perform the method in any one of the optional implementations of the first aspect and the method in any one of the optional implementations of the second aspect.

It can be learned from the foregoing technical solutions that, embodiments of this application have the following advantages.

In the embodiments of this application, the first network device generates the slice locator, where the slice locator includes the target argument, the slice locator is used to identify the addressable destination address prefix in the slice supported by the first network device, and the target argument is used to indicate that the slice locator is associated with the at least two slices supported by the first network device; and the first network device sends the slice locator to the second network device, so that the second network device generates, based on the slice locator, the at least two target slice locators corresponding to the at least two slices. In the foregoing description, because the target argument is added to the slice locator generated by the first network device, and the target argument indicates that the slice locator is associated with a plurality of slices, the first network device may only publish one slice locator. The network device that receives the slice locator generates, based on the indication of the target argument, the target slice locators whose quantity is equal to the quantity of slices, which may achieve the same effect as that achieved when the first network device sends the slice locators whose quantity is equal to the quantity of slices. Therefore, when supporting a relatively large quantity of slices, the first network device does not need to send a large quantity of slice locators. This simplifies an operation.

DESCRIPTION OF EMBODIMENTS

Embodiments of this application provide an SRv6-based data processing method. A network device may publish only one slice locator including slice information of the network device, and does not need to publish a corresponding slice locator for each slice supported by the network device. This simplifies an operation.

Update and upgrade of mobile communications technologies will undoubtedly bring various innovative applications to various industries. Mobile broadband, multimedia, machine type communication (MTC), industrial control, and an intelligent transportation system (ITS) will become main use cases in the 5G era. To meet greatly changing service requirements, a 5G network is to be flexibly constructed. Therefore, a network slice technology is introduced to 5G. The network slice technology divides a physical network into a plurality of virtual end-to-end networks, and each virtual network, including a device, an access technology, a transmission path, and a core network that are in the network, is logically independent. Each network slice is constituted by instantiating one independent network function or function combination, has a different function and characteristic, and faces a different requirement and service. The network slices are isolated so that different users or user groups can flexibly and dynamically define and customize network capabilities based on different application scenarios and requirements of the users or user groups, without affecting each other.

Figure 1:
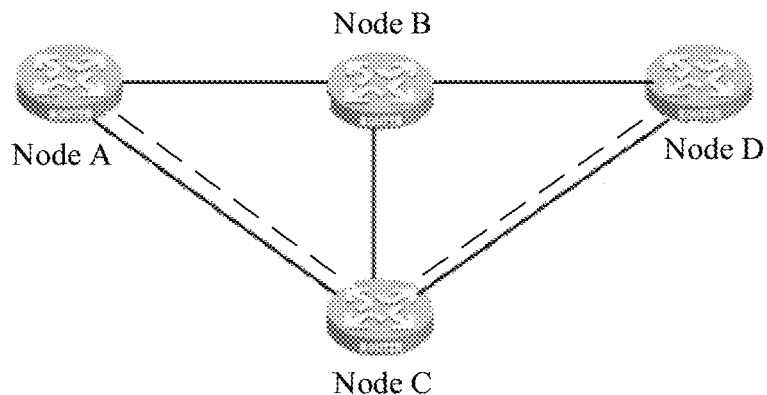
FIG. 1 is a schematic diagram of a network slice scenario to which this application is applied.

Similar to a requirement of network slicing, multi-topology routing (MTR) is that a physical topology is divided into a plurality of logical topologies, and the logical topologies may be intersected or overlapped (a link-by-link configuration). As shown in FIG. 1, a solid line represents a physical topology between a node A, a node B, a node C, and a node D, and a dashed line represents a logical topology between the node A, the node C, and the node D. It may be understood that, based on the physical topology shown in FIG. 1, in addition to the logical topology shown in FIG. 1, there may be another logical topology, for example a logical topology between the node A, the node B, and the node D, or a logical topology between the node A, the node B, and the node C.

An SR technology applied to an IPv6 network is called SRv6. The SR technology can specify a node and a path through which a packet carrying an SID list passes, to meet a traffic optimization requirement. SRv6 is a protocol designed based on a source routing concept, to forward an IPv6 data packet on a network. In SRv6 based on an IPv6 forwarding plane, an SRH is inserted into an IPv6 packet, an explicit IPv6 address stack (which may include a plurality of SIDs) is added to the SRH, and a destination address and an offset address stack are continuously updated by using a transit node, to implement hop-by-hop forwarding. For example, the IPv6 address stack includes an SID 1, an SID 2, and an SID 3. The packet is first forwarded to a node corresponding to the SID 1, then forwarded to a node corresponding to the SID 2, and then forwarded to a node corresponding to the SID 3. A manner of forwarding the packet to the SID 1 is determined based on a shortest path.

The following describes concepts related to the SRv6 technology.

SRH: An IPv6 packet includes a standard IPv6 header, an extension header, and a payload, where a quantity of extension headers is from 0 to n. To implement SRv6, an IPv6 extension header is added, and is referred to as an SRH. The SRH specifies an IPv6 explicit path, and stores information about an IPv6 segment list. A head node adds an SRH to the IPv6 packet, and a transit node forwards the packet based on path information included in the SRH.

Figure 2:
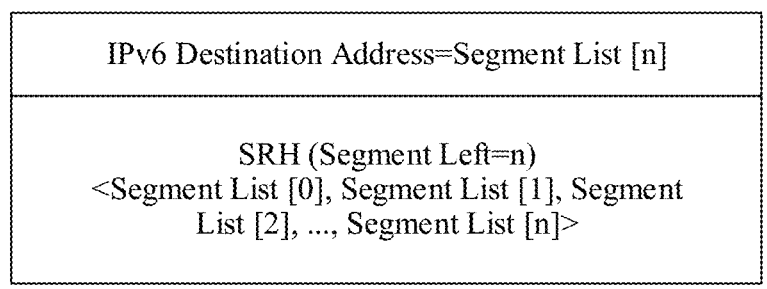
FIG. 2 is a schematic diagram of an abstract format of a segment routing header (SRH)

An abstract format of the SRH may be shown in FIG. 2. IPv6 Destination Address represents a destination address of an IPv6 packet, and is referred to as an IPv6 DA for short. In a common IPv6 packet, an IPv6 DA is fixed. In SRv6, an IPv6 DA identifies merely a next node of the current packet and changes accordingly. <Segment List [0], Segment List [1], Segment List [2], . . . , Segment List [n]> represents a segment list of an SRv6 packet, is similar to MPLS label stack information in MPLS, and is generated by an ingress node.

SID: An SRv6 segment is a binary value of 128 bits, and is also referred to as an SRv6 SID or an SID. The SID is an instantiated IPv6 address, and a unique function is assigned to the IPv6 address. One SRv6 SID can represent a node, a link, a slice, or a service. In other words, any network function can be defined by using the SID.

Figure 3:
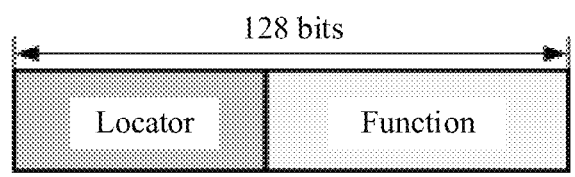
FIG. 3 is a schematic structural diagram of an SID.

A structure of the SID may be shown in FIG. 3. The SID is a network instruction, and includes a locator and a function. The locator is mainly responsible for a routing function, and therefore needs to be unique in an SR domain. The function may identify any function of a device, such as a forwarding behavior or a service. The structure of the SID facilitates programming of a network.

There are a plurality of types of SIDs. Different types of SIDs include different functions, that is, the functions in the SIDs are different. The most common types in the function are an endpoint function (e.g., an End function) and an endpoint function with layer-3 cross-connect (e.g., an End.X function).

Locator: The locator is used to identify a destination address prefix in a network. The locator is diffused to another network element by using the Interior Gateway Protocol (IGP). In a slice network, a node in each slice has a specific locator. All SIDs of the node in the slice need to be in IPv6 address space indicated by the prefix.

End function: The End function is used to identify a node in a network. The End function is diffused to another network element by using the IGP.

End.X function: The End.X function is used to identify a link in a network. The End.X function is diffused to another network element by using the IGP.

Flexible algorithm: The flexible algorithm (FA) may specify specific traffic engineering (TE) metrics to be used for some special SIDs for running a shortest path first (SPF) algorithm, and an SID of an SR that supports the FA corresponds to an FA ID. It may be understood that an IGP metric is usually used in a network to run the SPF algorithm to calculate a shortest path. However, sometimes, in a TE scenario, a TE metric is also used to calculate the shortest path. For example, some services are delay-sensitive, and it is more proper to use a delay as a metric.

In an FA scenario, when an SID is advertised, a special piece of information is carried, that is, information about an algorithm ID. Each node also advertises an algorithm supported by the node on the network, to construct a topology corresponding to the algorithm ID. In a sense, an FA mechanism has a same function as an MT mechanism. However, the FA mechanism does not emphasize a link-by-link configuration (but a node announces an algorithm to participate in), and therefore is more flexible. The FA mechanism may also be used to implement network slicing. Similar to the MT mechanism, the FA mechanism may also be used together with a FlexE interface or a channelized sub-interface to ensure resource isolation of a slice.

In a current solution that combines SRv6 and network slicing, different locators are allocated to different slices to guide slice traffic forwarding, so as to ensure that slice traffic does not affect each other. After the foregoing configuration is completed, each node in each slice in the network has an own locator. In this way, when slice traffic forwarding is implemented, slice resources corresponding to a device can be isolated from each other by using an SID corresponding to each slice. However, in this solution, a network device needs to publish a locator corresponding to each slice. In this case, when there are a relatively large quantity of slices, a large quantity of locators need to be published, and an operation is relatively complex.

To resolve the foregoing problem, an embodiment of this application provides an SRv6-based data processing method. In the SRv6-based data processing method, processing logic of a network device that publishes a locator and a network device that receives a locator changes correspondingly. The following separately describes the processing logic.

Figure 4:
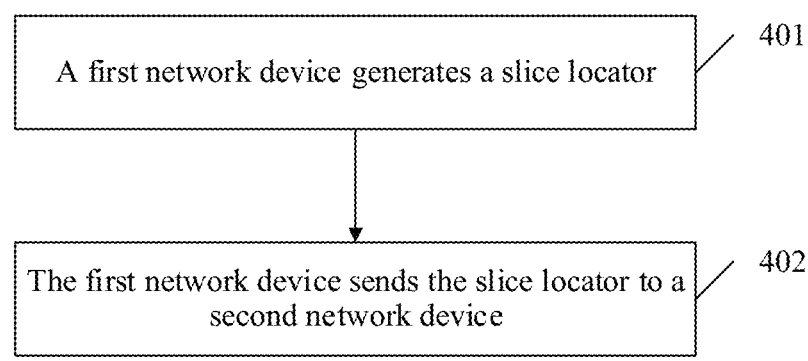
FIG. 4 is a schematic diagram of an embodiment of an SRv6-based data processing method according to this application.

Refer to FIG. 4. An embodiment of the SRv6-based data processing method according to this application includes the following steps.

401: A first network device generates a slice locator.

In this embodiment, the first network device may generate the slice locator including a target argument (ARG). It may be understood that the slice locator in this application is a locator in an SID. However, the slice locator is applied to a locator in a slice network, that is, a slice locator. Similar to a conventional locator, the slice locator generated by the first network device in this application is mainly responsible for a routing function, and may indicate an addressable destination address prefix in a slice supported by the first network device. Different from the conventional locator, the ARG in the slice locator generated by the first network device in this application may indicate that the slice locator is associated with at least two slices. In this case, a network device that receives the slice locator may determine, based on the ARG, that the slice locator is a special locator and is not in a one-to-one correspondence with the slice, and may further generate at least two target slice locators based on the slice locator.

Specifically, the ARG may carry slice information of the first network device, that is, the ARG may indicate a characteristic of each slice supported by the first network device. Specifically, the first network device may complete local slice configuration by obtaining information about another network device in the slice network, and obtain local slice information. The slice information may indicate a slice supported by the first network device, and the slice information may include information such as a quantity of slices supported by the first network device and an identifier (ID) of each slice.

It should be noted that the first network device may allocate a corresponding slice identifier (slice ID) to each slice supported by the first network device. In different application scenarios, the slice identifier may specifically be a multi-topology identifier (MT ID), a flexible algorithm identifier (FA ID), or the like. It is assumed that a channelized sub-interface technology or a Flexible Ethernet (FlexE) technology is combined. Therefore, each slice may have an exclusive bandwidth of the slice. In this case, a configuration manner is to configure a corresponding slice identifier for each sub-interface, each sub-interface has a link corresponding to the slice identifier, and links with a same slice identifier are combined into a topology corresponding to the slice identifier in the slice network.

It should be noted that, in a conventional manner, the first network device sends a locator, and after receiving the locator from the first network device, another network device performs corresponding processing on the locator based on a requirement, for example, recording the locator used to generate a forwarding entry. If the first network device supports a plurality of slices, the first network device needs to send slice locators corresponding to the slices. However, in the solution of this application, because formats of slice locators corresponding to slices are substantially similar, one ARG may be used to indicate a characteristic of a slice locator corresponding to each slice. Therefore, the first network device may send only one slice locator including the ARG. The another network device that receives the slice locator may generate, based on the ARG, a plurality of slice locators corresponding to the slices. This is equivalent to receiving slice locators that are from the first network device and whose quantity is equal to a quantity of slices. It may be understood that, in this application, an ideal quantity of slice locators sent by the first network device is only one. A quantity of slice locators may alternatively be more than one but less than a quantity of slices supported by the first network device. This is not specifically limited herein.

402: The first network device sends the slice locator to a second network device.

In this embodiment, after generating the slice locator, the first network device sends the slice locator to the second network device. It should be noted that the second network device and the first network device are in a same IGP domain, and the second network device may be any network device in the IGP domain other than the first network device. In other words, the first network device may send the slice locator to all other network devices in the IGP domain.

It should be noted that, in an original scenario without a network slice, the first network device needs to send only one locator corresponding to a physical topology. In a network slice scenario of this application, the first network device needs to send one locator corresponding to a physical topology, and a slice locator corresponding to a slice (logical topology), that is, send the slice locator carrying the ARG and the SID that supports the slice locator. Specifically, in this application, the first network device may send the slice locator carrying the ARG to the second network device in the following two manners: Manner 1: The first network device independently publishes the slice locator carrying the ARG, that is, the slice locator carrying the ARG is independent of the locator corresponding to the physical topology. Manner 2: The first network device publishes the slice locator carrying the ARG as a subset of the locator corresponding to the physical topology. The following describes the foregoing two manners by using examples.

Figure 5:
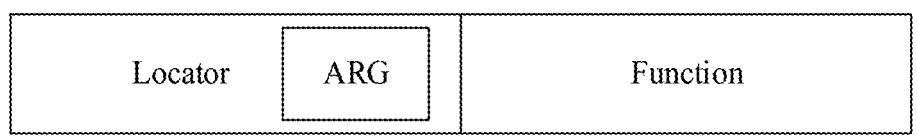
FIG. 5 is a schematic structural diagram of an SID including a target argument.

Manner 1: For example, the locator that corresponds to the physical topology and that is of the first network device is A1::/64, where A1 represents the first network device, first 64 bits are the locator, and last 64 bits are a function. It is assumed that coding of the locator is specifically 00A1:0000:0000:0000. An SID corresponding to the physical topology does not include the SID carrying the ARG. The SID carrying the ARG may be A1:ARG::/64, and coding of the SID carrying the ARG is A1:ARG=00A1:0000:0000:1111, where A1 corresponds to 00A1:0000:0000, and the ARG corresponds to 1111 (which is an initial value of the ARG herein), that is, last 16 bits of the 64-bit locator is the ARG. A format of the SID carrying the ARG may be shown in FIG. 5.

Manner 2: For example, the locator that corresponds to the physical topology and that is of the first network device is still A1:164, and coding of the locator is 00A1:0000:0000:0000. However, the slice locator carrying the ARG may be A1:ARG::/80, and coding of the slice locator is A1:ARG=00A1:0000:0000:0000:1111, where A1 corresponds to 00A1:0000:0000:0000, and the ARG corresponds to 1111. Actually, the slice locator carrying the ARG uses subspace of the locator corresponding to the physical topology, that is, the locator corresponding to the physical topology includes the slice locator carrying the ARG.

In addition, in Manner 1, ARG=0000 should not exist. In this way, space of an SID of each slice may not overlap with space of the SID corresponding to the physical topology.

In addition, in Manner 2, because the locator corresponding to the physical topology includes the slice locator carrying the ARG, address space covered by the locator corresponding to the physical topology is occupied. Therefore, a range of a function of the SID corresponding to the physical topology needs to be reduced, to be specific, the range needs to start with 0000, and last 48 bits can be encoded freely.

It should be noted that because the SID of the slice includes the slice locator and a slice function, in addition to the slice locator, the first network device further sends the slice function to the second network device. The slice function includes an instruction set by the first network device, and the instruction may indicate any function of the first network device, for example, a forwarding behavior or a service. The function in this application is classified into two types: an End function and an End.X function, where the End function may identify node information of the first network device, and the End.X function may identify a link supported by the first network device. The following describes the two types of functions by using examples.

End function: The End function published by the first network device corresponds to the slice locator. The first network device may publish only one slice locator, and correspondingly, only one End function is published. However, in a local SID list of the first network device, SIDs whose quantity is equal to the quantity of slices may be stored. For example, the first network device (A1) has two corresponding slices (a slice 1 and a slice 2), and the local SID list may store the following two SIDs: 00A1:0000:0000:0001:0000:0000:0000:0001 (corresponding to an End function of the slice 1) and 00A1:0000:0000:0002:0000:0000:0000:0001 (corresponding to an End function of the slice 2). End functions corresponding to different slices can be set to 0000:0000:0000:0001.

End.X function: Although the first network device may publish only one SID, a plurality of SIDs may still be stored in a local SID list of the first network device. However, because a function in the SID is an End.X function, a quantity of stored SIDs is related to both the quantity of slices and a quantity of links supported by the first network device. For example, the first network device (A1) has two corresponding slices (a slice 1 and a slice 2), a quantity of links supported by the first network device corresponding to the slice 1 is 2, and a quantity of links supported by the first network device corresponding to the slice 2 is 1. Then, the local SID list may store the following three SIDs: 00A1:0000:0000:0001:0000:0000:0000:00C1 (corresponding to an End.X function of a link between A1 and A2 in the slice 1), 00A1:0000:0000:0001:0000:0000:0000:00C2 (corresponding to an End.X function of a link between A1 and A3 in the slice 1), and 00A1:0000:0000:0002:0000:0000:0000:00C2 (corresponding to an End.X function of a link between A1 and A3 in the slice 2).

The foregoing describes a procedure of the SRv6-based data processing method in this application. The following describes formats of the slice locator and the function in this application.

Figure 6:
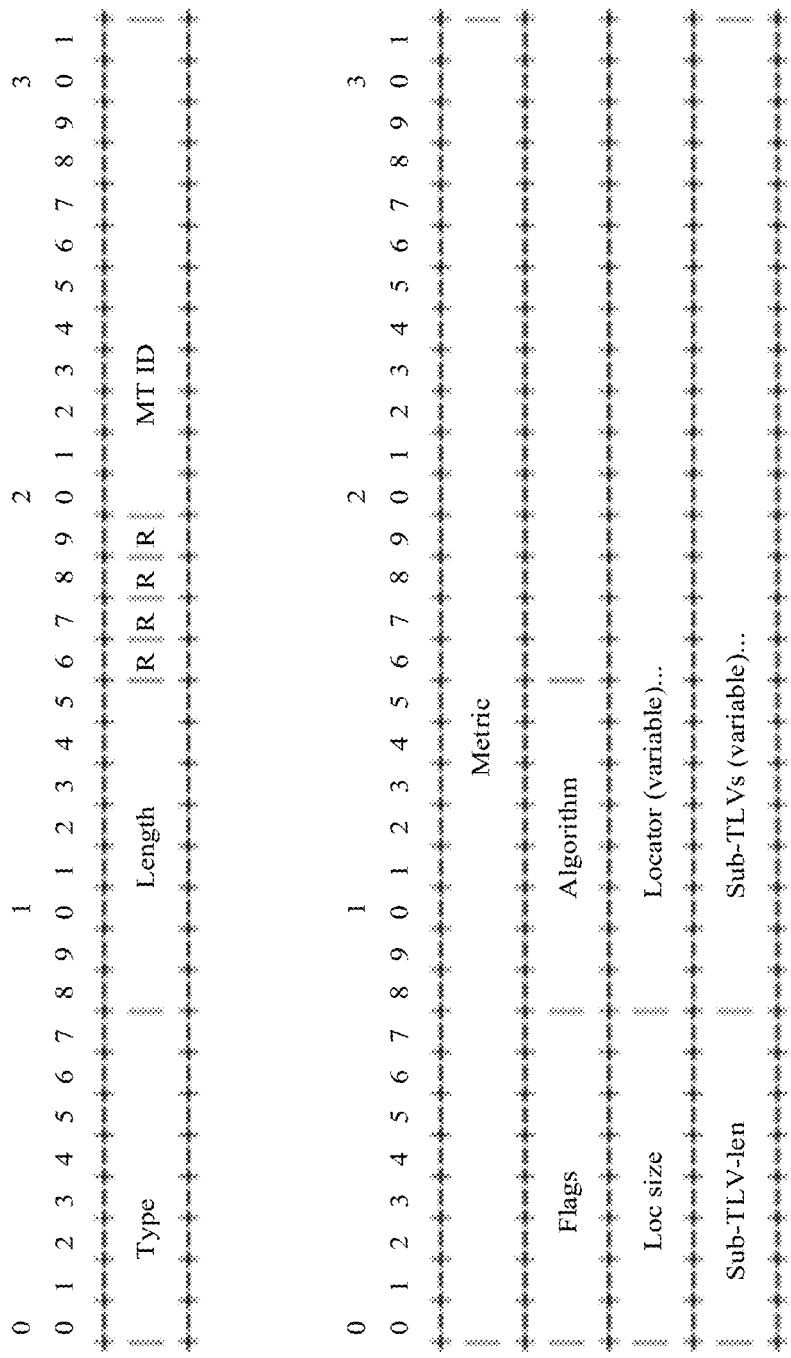
FIG. 6 is a schematic diagram of a format of a slice locator in an SID.

A current format of the slice locator may be shown in FIG. 6. The format of the slice locator shown in FIG. 6 is a TLV, including a type, a length, an MT ID, a metric, a flag, an algorithm, a locator size, a locator value (e.g., a locator variable), a sub-TLV length (Sub-tiv-len), and a sub-TLV value (e.g., a Sub-TLVs variable).

Figure 7:
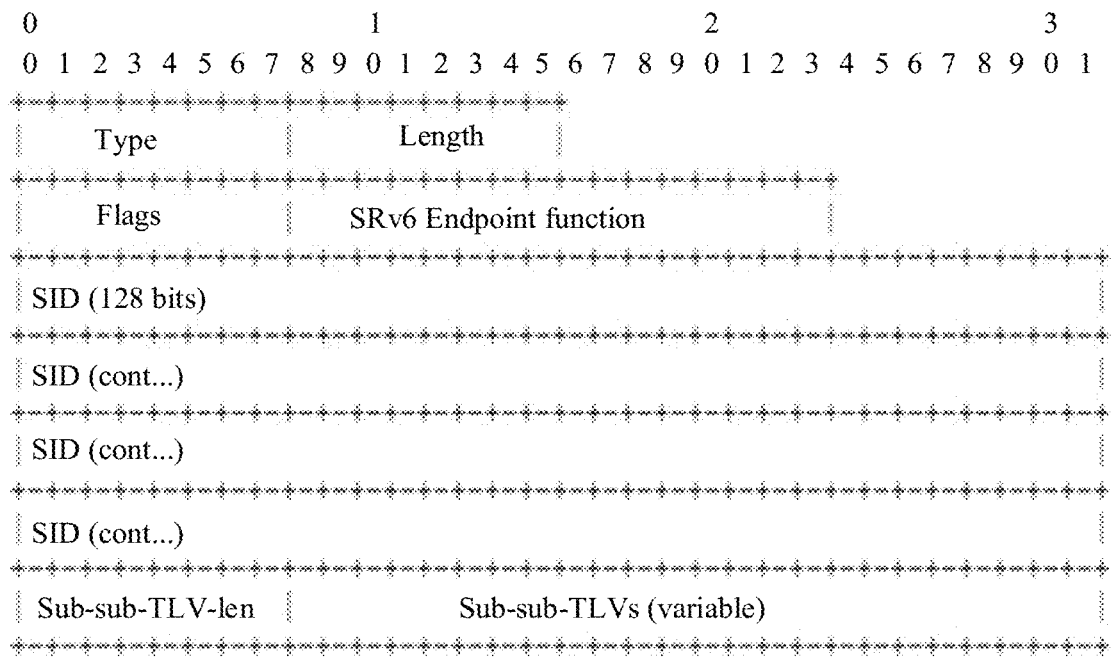
FIG. 7 is a schematic diagram of a format of an End function in an SID.

The function may be published as a sub-TLV of the slice locator. For example, the format of the function is specifically an End function and is shown in FIG. 7. FIG. 7 is a format of a sub-TLV of the slice locator. That type=5 indicates that the sub-TLV is an End function sub-TLV, an SID indicates a specific SID value of the function, and the sub-TLV further includes a sub-sub-TLV length (Sub-sub-tiv-len) and a sub-sub-TLV value (e.g., a sub-sub-TLVs variable).

Optionally, an SRv6 Endpoint function herein may be a type with a value different from the function, for example, 0x0100.

Figure 8:
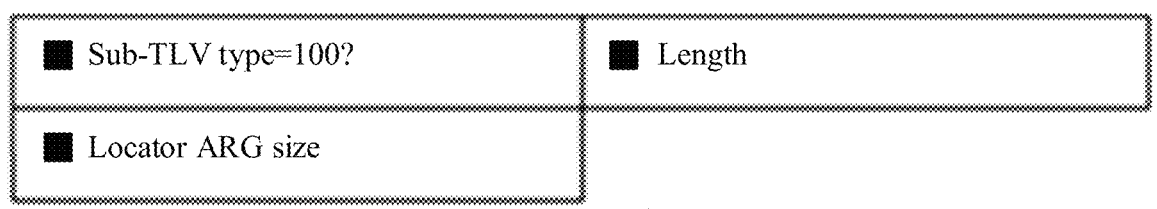
FIG. 8 is a schematic diagram of a sub-TLV belonging to a slice locator.

In an implementation, a sub-TLV belonging to the slice locator is added based on the format of the foregoing slice locator in this application. Specifically, as shown in FIG. 8, the sub-TLV indicates that the slice locator to which the sub-TLV belongs is a slice locator carrying a target argument (ARG), indicates a size of the target argument, and indirectly indicates a location (from a bit to a bit) of the target argument. It may be understood that adding the sub-TLV may cause a change of some fields in the original slice locator, for example, a meaning of the MT ID or a meaning of the algorithm. Adding the sub-TLV enables another network device to identify that the slice locator is different from another locator in this embodiment. Specifically, the locator in this application may be stored in a top TLV 27 in the IS-IS protocol for publishing. After receiving the slice locator, another network device parses the slice locator and triggers an End function related to checking and parsing (for example, the End function may be stored in the sub-TLV of the slice locator) and an End.X function (for example, the End.X function may be stored in a sub-TLV of a top TLV 22 in the IS-IS protocol, where the top TLV 22 in the IS-IS protocol means Extended IS reachability TLV, type 22).

For example, a size of the slice locator is 64, the value is 00A1:0000:0000:1111, the End function is 00A1:0000:1111:0000:0000:0001, and a size of the ARG in the slice locator is 16, which indicates that the ARG is represented by the $49^{th}$ bit to the $64^{th}$ bit. For another example, a size of the slice locator is 80, the value is 00A1:0000:0000:0000:1111, the End function is 00A1:0000:0000:0000:1111:0000:0000:0001, and a size of the ARG in the slice locator is 16, which indicates that the ARG is represented by the $65^{th}$ bit to the $80^{th}$ bit.

Figure 9:
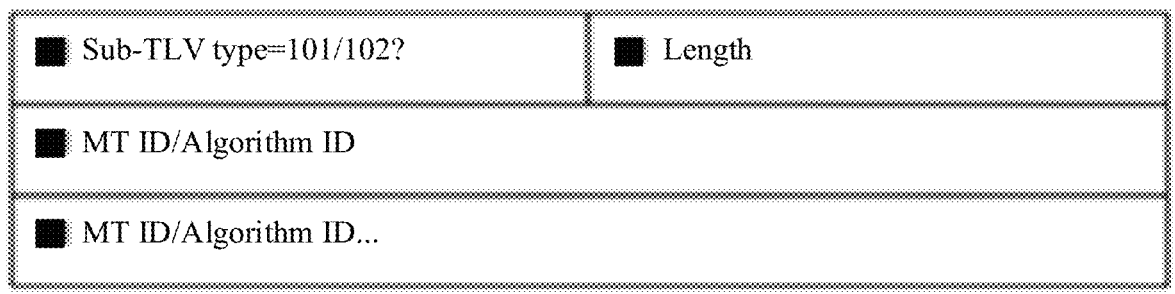
FIG. 9 is a schematic diagram of another sub-TLV belonging to a slice locator.

Optionally, another sub-TLV belonging to the slice locator may be added based on the format of the slice locator. Specifically, as shown in FIG. 9, the sub-TLV indicates the slice information of the first network device, that is, the quantity of slices supported by the first network device and an identifier of each slice. It may be understood that the network device that receives the slice locator may determine, based on the sub-TLV shown in FIG. 9, a quantity of target slice locators that may be generated based on the slice locator, and correspondingly indicate a quantity of target End functions that may be generated based on the End function.

It should be noted that if the slice locator does not include the sub-TLV shown in FIG. 9, another network device that receives the slice locator may obtain, based on slice topology information, the quantity of slices supported by the first network device and an identifier of each slice, that is, determining the quantity of target slice locators that may be generated based on the slice locator and the quantity of target End functions that may be generated based on the End function, namely, specific values of an MT ID and an algorithm ID in FIG. 9. For example, the slice topology information collected based on an IGP indicates that two slices are added to the network device, and slice locators corresponding to the two slices are generated respectively.

In addition, the sub-TLV shown in FIG. 9 may specifically be an MT of a related type, or may be an FA of a related type. Both the MT of a related type and the FA of a related type may indicate the slice supported by the first network device. If the MT ID is used to identify different slices, the sub-TLV may be set, for example, to a sub-TLV 101. If the algorithm ID is used to identify different slices, the sub-TLV may be set to another value, for example, a sub-TLV 102.

Figure 10:
FIG. 10 is a schematic diagram of another sub-TLV belonging to a slice locator.

Optionally, if the slice locator includes the sub-TLV shown in FIG. 9, another sub-TLV belonging to the slice locator may further be added. As shown in FIG. 10, the sub-TLV is used to assign, based on a sequence of the sub-TLV shown in FIG. 9, different metrics (metric) to generate target slice locators.

It should be noted that if the MT ID is used as the slice identifier, the MT ID in the slice locator shown in FIG. 6 may be set to 0. However, information in the MT ID field may be of another MT. Specifically, this may be determined by the sub-TLV shown in FIG. 9. Likewise, the foregoing description is also applicable to a case in which the algorithm ID is used as the slice identifier.

FIG. 7 describes a format in which the function is specifically an End function. When the function is specifically an End.X function, an SID of the End.X function needs to be associated with a specific neighbor. Therefore, the SID of the End.X function is published at a location different from a location at which an SID of the End function is published. Specifically, the End.X function may be published in the top TLV 22, a top TLV 23, a top TLV 222, a top TLV 223, or a top TLV 141 in the IS-IS protocol. A format of the End.X function may be shown in FIG. 11. The End.X function shown in FIG. 11 also needs to be within coverage of the locator, and is announced by the first network device. In addition, bits of an ARG corresponding to the End.X function may all be set to 1. However, a specific router may determine a quantity of to-be-generated End.X functions based on a sub-TLV of the End.X function shown in FIG. 12. The sub-TLV shown in FIG. 12 and the sub-TLV shown in FIG. 9 are both optional. In other words, if the sub-TLV shown in FIG. 12 is not included, a network device that receives the End.X function may determine to generate a quantity of End.X functions based on slice topology information and the End.X function. For example, the slice topology information collected based on the IGP indicates that two slices are added to a link, and End.X functions corresponding to the two slices are generated respectively.

Optionally, an SRv6 Endpoint function herein may be a type with a value different from the End.X function, for example, 0x0105.

Figure 11:
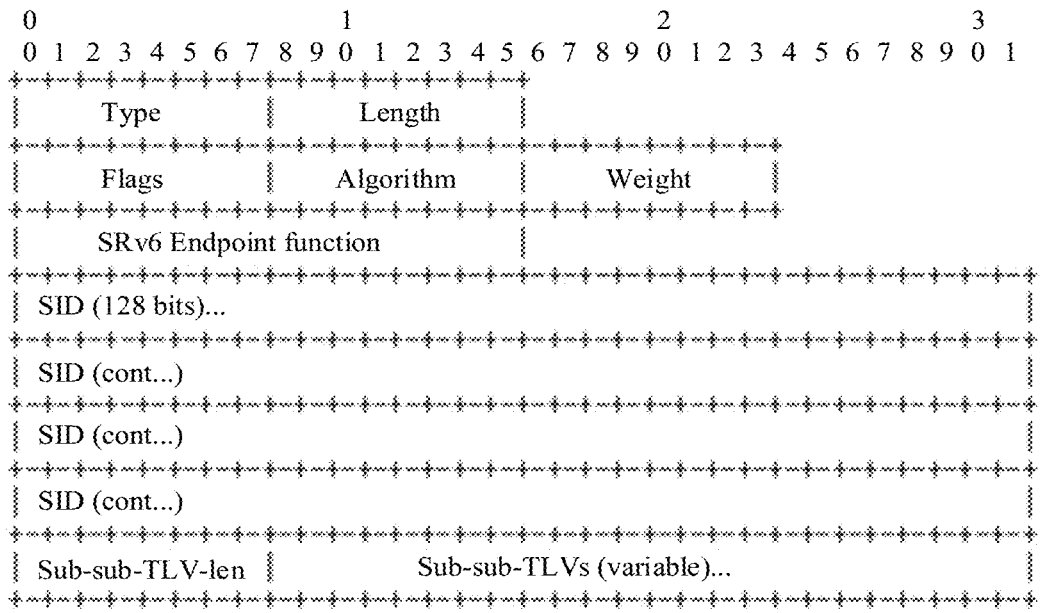
FIG. 11 is a schematic diagram of a format of an End.X function applied to a point-to-point adjacency relationship.
Figure 12:
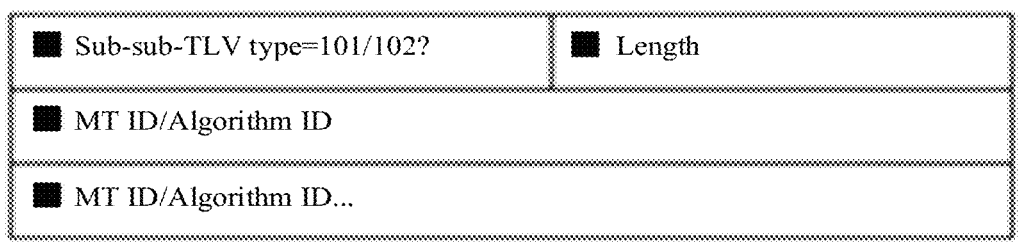
FIG. 12 is a schematic diagram of a sub-TLV belonging to an End.X function.
Figure 13:
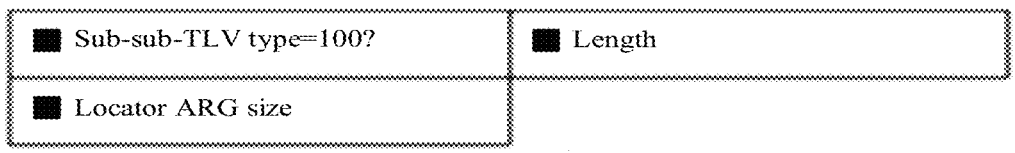
FIG. 13 is a schematic diagram of another sub-TLV belonging to an End.X function.

Optionally, the End.X function shown in FIG. 11 may also include a sub-TLV shown in FIG. 13. The sub-TLV indicates that the End.X function belongs to a slice locator carrying the target ARG, and indicates a size of the target argument.

Figure 14:
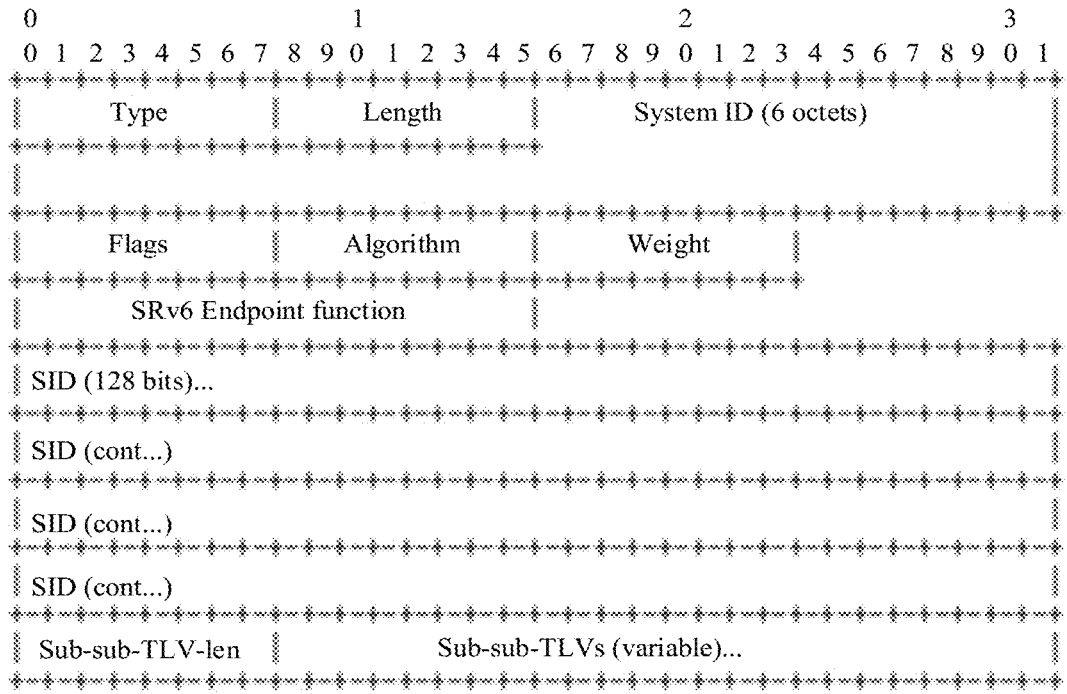
FIG. 14 is a schematic diagram of a format of an End.X function applied to a LAN-type adjacency relationship.

The End.X function shown in FIG. 11 is applied to a point-to-point adjacency relationship. In addition, the End.X function is also applied to a LAN-type adjacency relationship. A format of the End.X function applied to the LAN-type adjacency relationship is shown in FIG. 14. The format of the End.X function is similar to that in FIG. 11, and corresponding description is not described herein again.

In the embodiments of this application, the first network device generates the slice locator, where the slice locator includes the target argument, the slice locator is used to identify the addressable destination address prefix in the slice supported by the first network device, and the target argument is used to indicate that the slice locator is associated with the at least two slices supported by the first network device; and the first network device sends the slice locator to the second network device, so that the second network device generates, based on the slice locator, the at least two target slice locators corresponding to the at least two slices. In the foregoing description, because the target argument is added to the slice locator generated by the first network device, and the target argument indicates that the slice locator is associated with the plurality of slices, the first network device may only publish one slice locator. The network device that receives the slice locator generates, based on the indication of the target argument, the target slice locators whose quantity is equal to the quantity of slices, which may achieve the same effect as that achieved when the first network device sends the slice locators whose quantity is equal to the quantity of slices. When supporting a relatively large quantity of slices, the first network device does not need to send a large quantity of slice locators. This simplifies an operation.

The foregoing describes the SRv6-based data processing method in this application from a perspective of the first network device that sends the slice locator. The following describes an SRv6-based data processing method in this application from a perspective of a second network device that receives a slice locator.

Figure 15:
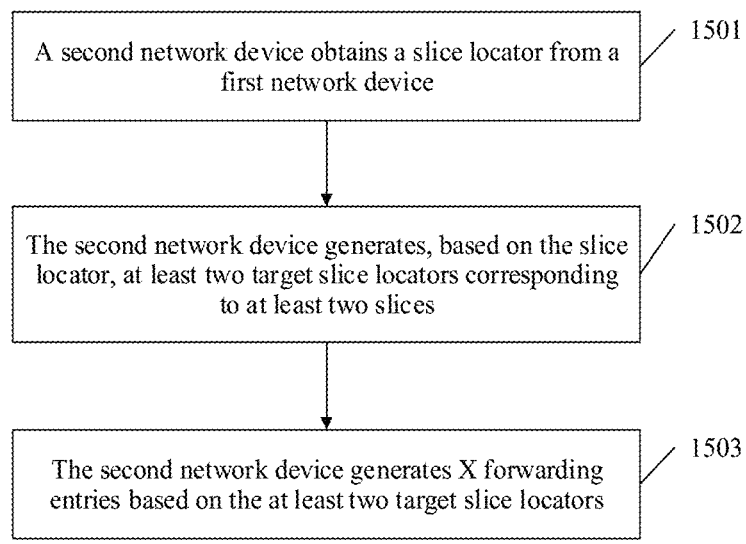
FIG. 15 is a schematic diagram of another embodiment of an SRv6-based data processing method according to this application.

Refer to FIG. 15. Another embodiment of the SRv6-based data processing method according to this application includes the following steps.

1501: A second network device obtains a slice locator from a first network device.

In this embodiment, the second network device may obtain the slice locator from the first network device. Description about the slice locator is similar to related description in the embodiment shown in FIG. 4. Details are not described herein again.

1502: The second network device generates, based on the slice locator, at least two target slice locators corresponding to at least two slices.

In this embodiment, because the target slice locator carries a target ARG, and the ARG indicates that the slice locator is associated with a plurality of slices, the second network device may generate a plurality of target slice locators based on the slice locator. Specifically, the second network device may generate the at least two target slice locators based on the slice locator in the following two manners. The following describes the two manners.

Manner 1: If the slice locator includes slice information supported by the first network device, the second network device may obtain, based on the slice locator, a quantity of slices supported by the first network device and an identifier of each slice. Correspondingly, the second network device generates a target slice locator corresponding to each slice. This is equivalent to receiving slice locators that are from the first network device and whose quantity is equal to the quantity of slices.

Manner 2: If the slice locator does not include slice information supported by the first network device, the second network device may obtain, based on slice topology information, a quantity of slices supported by the first network device and an identifier of each slice. Similarly, the second network device may generate a target slice locator corresponding to each slice.

1503: The second network device generates X forwarding entries based on the at least two target slice locators.

In this embodiment, after generating the at least two target slice locators, the second network device may further generate the forwarding entries based on the target slice locators. Specifically, the second network device does not need to generate forwarding entries corresponding to all target slice locators. The second network device may select, from the slices supported by the first network device, X slices to which the second network device belongs, and further generate only the X forwarding entries corresponding to the X slices. For example, the first network device supports ten slices in total, and the second network device only belongs to three of the ten slices. The second network device only needs to generate three forwarding entries corresponding to the three slices, and may not generate a forwarding entry corresponding to a slice to which the second network device does not belong. This reduces an unnecessary operation.

The following describes the SRv6-based data processing method in this application with reference to an application scenario.

Figure 16:
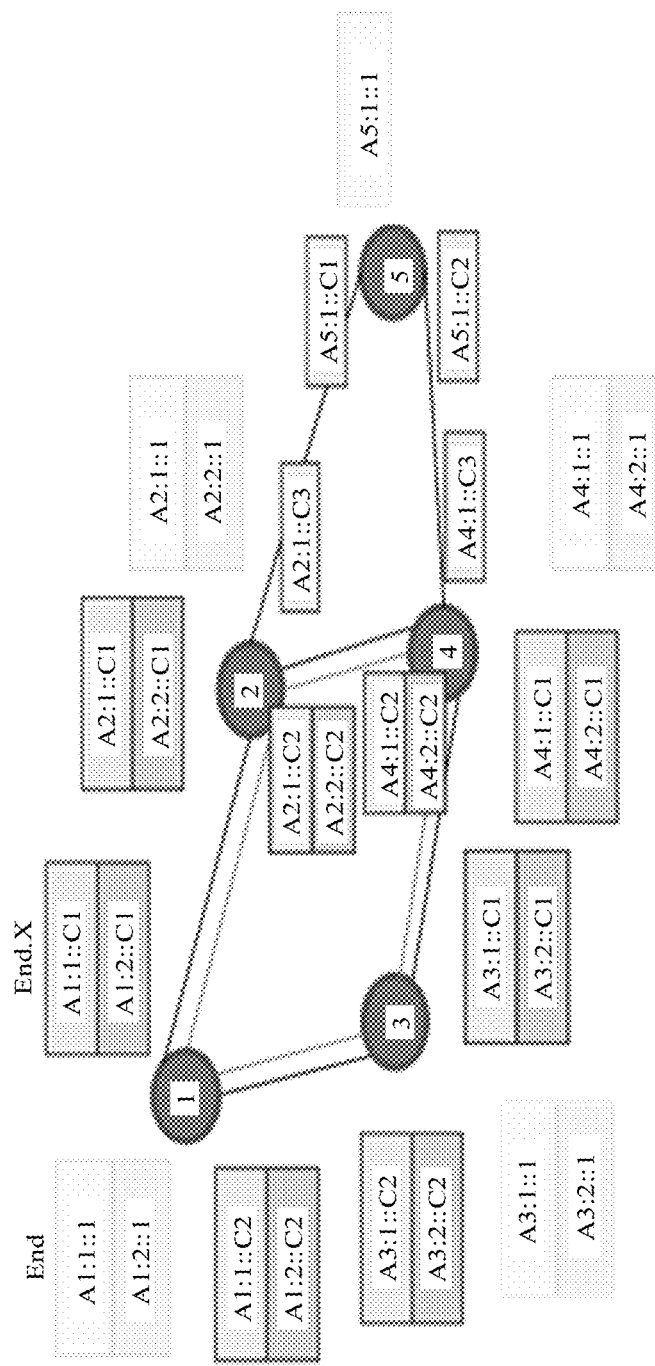
FIG. 16 is a schematic diagram of an application scenario of an SRv6-based data processing method according to this application.

Refer to FIG. 16. A slice network includes five nodes in total, and there are two virtual topologies respectively corresponding to a slice 1 (a virtual topology in a solid line in FIG. 16) and a slice 2 (a virtual topology in a dashed line in FIG. 16). To be specific, the slice 1 includes all nodes and link resources, and the slice 2 includes a node 1, a node 2, a node 3, a node 4, and an interconnected link. It may be understood that a physical topology includes all nodes and links, the physical topology uses a remaining bandwidth resource of a slice, and bandwidth of the physical topology and bandwidth of the slice are isolated.

Based on the method in this application, for example, a slice locator that the node 1 needs to send is 00A1:0000:0000:1111::/64, where the slice locator may carry the sub-TLVs shown in FIG. 8 and FIG. 9, and the slice 1 and the slice 2 are respectively identified by using an MT ID 1 and an MT ID 2. After receiving the slice locator, the node 2, the node 3, and the node 4 parse the slice locator, and generate the following two target slice locator, that is, 00A1:0000:0000:0001::/64 (corresponding to the slice 1) and 00A1:0000:0000:0002::/64 (corresponding to the slice 2). This is equivalent to receiving two slice locators respectively corresponding to the slice 1 and the slice 2. The node 2, the node 3, and the node 4 further generate forwarding entries in corresponding topologies of the slice 1 and the slice 2. It may be understood that because a node 5 only belongs to the slice 1 and does not belong to the slice 2, after receiving the slice locator, the node 5 parses the slice locator and generates only one target slice locator, for example, 00A1:0000:0000:0001::/64.

Correspondingly, for example, an End function that the node 1 needs to send is 00A1:0000:0000:1111:0000:0000:0000:0001. The node 2, the node 3, and the node 4 may parse the End function into the following two target End functions, that is, 00A1:0000:0000:0001:0000:0000:0000:0001 (corresponding to the slice 1) and 00A1:0000:0000:0002:0000:0000:0000:0001 (corresponding to the slice 2). Similarly, a situation is slightly different for the node 5.

Correspondingly, it is assumed that links supported by the node 1 include a link 1 and a link 2. For the link 1, for example, an End.X function that the node 1 needs to send is 00A1:0000:0000:1111:0000:0000:0000:00C1 (corresponding to the link 1). The node 2, the node 3, and the node 4 may parse the End.X function into the following two target End.X functions, that is, 00A1:0000:0000:0001:0000:0000:0000:00C1 (corresponding to the slice 1) and 00A1:0000:0000:0002:0000:0000:0000:00C1 (corresponding to the slice 2). Similarly, a situation is slightly different for the node 5.

Similarly, for the link 2, for example, an End.X function that the node 1 needs to send is 00A1:0000:0000:1111:0000:0000:0000:00C2 (corresponding to the link 2). The node 2, the node 3, and the node 4 may parse the End.X function into the following two target End.X functions, that is, 00A1:0000:0000:0001:0000:0000:0000:00C2 (corresponding to the slice 1) and 00A1:0000:0000:0002:0000:0000:0000:00C2 (corresponding to the slice 2). Similarly, a situation is slightly different for the node 5.

The foregoing describes the SRv6-based data processing method in this embodiment of this application. The following describes a first network device in this embodiment of this application.

Figure 17:
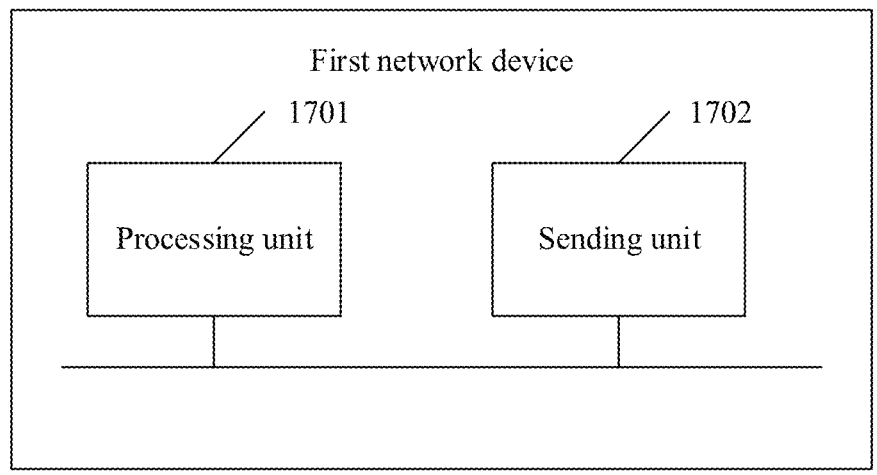
FIG. 17 is a schematic diagram of an embodiment of a first network device according to this application.

FIG. 17 is a schematic diagram of an embodiment of the first network device according to an embodiment of this application. The first network device includes: a processing unit 1701, configured to generate a slice locator, where the slice locator includes a target argument, the slice locator is used to identify an addressable destination address prefix in a slice supported by the first network device, and the target argument is used to indicate that the slice locator is associated with at least two slices supported by the first network device; and a sending unit 1702, configured to send the slice locator to a second network device, so that the second network device generates, based on the slice locator, at least two target slice locators corresponding to the at least two slices.

Optionally, the target argument includes slice information, and the slice information includes a quantity of slices supported by the first network device and identifiers of the slices.

Optionally, a format of the slice locator is a first type-length-value TLV, a format of the target argument includes a first sub-TLV belonging to the first TLV, and the first sub-TLV indicates a size and a location of the target argument.

Optionally, the format of the target argument further includes a second sub-TLV belonging to the first TLV, and the second sub-TLV is used to indicate the slice information.

Optionally, the sending unit 1702 is specifically configured to send a physical topology locator to the second network device, where the physical topology locator includes the slice locator, and the physical topology locator is used to identify an addressable destination address prefix in a physical topology.

Optionally, the sending unit 1702 is further configured to send a slice function corresponding to the slice locator to the second network device, where the slice function is used to indicate an instruction set by the first network device.

The following describes a second network device according to an embodiment of this application.

Figure 18:
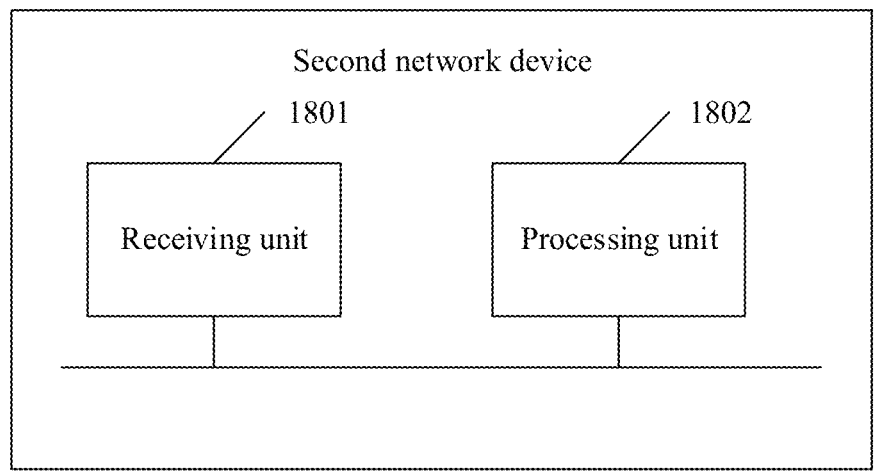
FIG. 18 is a schematic diagram of an embodiment of a second network device according to this application.

FIG. 18 is a schematic diagram of an embodiment of the second network device according to an embodiment of this application. The second network device includes: a receiving unit 1801, configured to receive a slice locator from a first network device, where the slice locator includes a target argument, the slice locator is used to identify an addressable destination address prefix in a slice supported by the first network device, and the target argument is used to indicate that the slice locator is associated with at least two slices supported by the first network device; and a processing unit 1802, configured to generate, based on the slice locator, at least two target slice locators corresponding to the at least two slices, where the processing unit 1802 is further configured to generate X forwarding entries based on the at least two target slice locators, where X is an integer greater than or equal to 1, and X is less than or equal to a quantity of target slice locators.

Optionally, a format of the slice locator is a first type-length-value TLV, a format of the target argument is a first sub-TLV belonging to the first TLV, and the first sub-TLV indicates a size and a location of the target argument.

Optionally, the processing unit 1802 is specifically configured to: obtain slice information from slice topology information based on an indication of the target argument, where the slice information includes a quantity of slices supported by the first network device and identifiers of the slices; and generate the at least two target slice locators based on the slice information.

Optionally, the format of the target argument further includes a second sub-TLV belonging to the first TLV, the second sub-TLV is used to indicate slice information, and the slice information includes a quantity of slices supported by the first network device and identifiers of the slices; and the processing unit 1802 is specifically configured to generate the at least two target slice locators based on the slice information.

Optionally, the processing unit 1802 is specifically configured to: obtain, from the at least two slices corresponding to the at least two target slice locators, X slices to which the second network device belongs; and generate the X forwarding entries corresponding to the X slices.

Optionally, the receiving unit 1801 is further configured to: receive a slice function from the first network device, where the slice function is used to indicate an instruction set by the first network device.

The foregoing describes the first network device and the second network device in the embodiments of this application from a perspective of a modular functional entity. The following describes a network device (including the first network device and the second network device) according to an embodiment of this application from a perspective of hardware processing.

Figure 19:
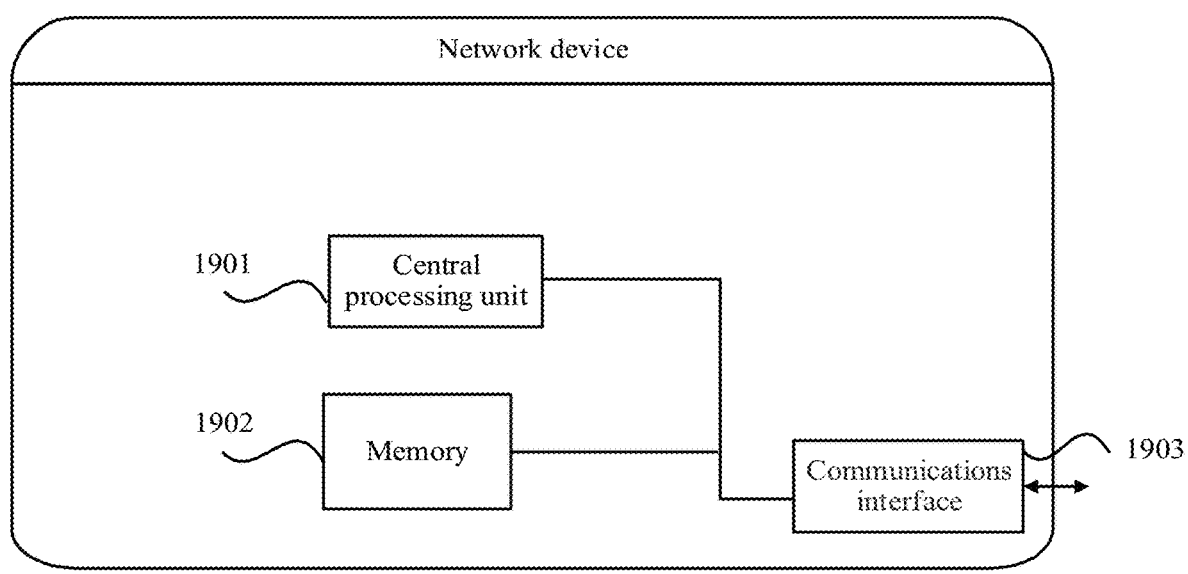
FIG. 19 is a schematic structural diagram of a network device according to this application.

Refer to FIG. 19. The network device in this application includes one or more central processing units 1901, a memory 1902, and a communications interface 1903. The central processing unit 1901, the memory 1902, and the communications interface 1903 are connected to each other through a bus.

The memory 1902 may be transient storage or persistent storage, and is configured to store related instructions and data. The communications interface 1903 is configured to receive and send data. Further, the central processing unit 1901 may be configured to communicate with the memory 1902, and perform a series of instruction operations in the memory 1902.

Both the first network device and the second network device in the foregoing embodiments may be based on a structure shown in FIG. 19. Specifically, the network device may be configured to execute all or some actions performed by the first network device and the second network device in the embodiments shown in FIG. 4 and FIG. 15.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A Segment Routing over Internet Protocol version 6 (SRv6)-based data processing method implemented by a first network device, wherein the SRv6-based data processing method comprises:
   generating a slice locator, wherein the slice locator comprises a target argument, wherein the slice locator identifies an addressable destination address prefix in slices supported by the first network device, and wherein the target argument indicates that the slice locator is associated with at least two slices supported by the first network device;
   sending the slice locator to a second network device; and
   sending a slice function corresponding to the slice locator to the second network device,
   wherein the slice function indicates an instruction set by the first network device.

2. The SRv6-based data processing method of claim 1, wherein the target argument comprises slice information, and wherein the slice information comprises a quantity of slices supported by the first network device and identifiers of the slices.

3. The SRv6-based data processing method of claim 2, wherein a first format of the slice locator is first type-length-value (TLV), wherein a second format of the target argument comprises is first sub-TLV belonging to the first TLV, and wherein the first sub-TLV indicates a size and a location of the target argument.

4. The SRv6-based data processing method of claim 3, wherein the second format further comprises a second sub-TLV belonging to the first TLV, and wherein the second sub-TLV indicates the slice information.

5. The SRv6-based data processing method of claim 1, further comprising sending a physical topology locator to the second network device, wherein the physical topology locator comprises the slice locator, and wherein the physical topology locator identifies an addressable destination address prefix in a physical topology.

6. A Segment Routing over Internet Protocol version 6 (SRv6)-based data processing method implemented by a second network device, wherein the SRv6-based data processing method comprises:
   receiving a slice locator from a first network device, wherein the slice locator comprises a target argument, wherein the slice locator identifies an addressable destination address prefix in slices supported by the first network device, and wherein the target argument indicates that the slice locator is associated with at least two slices supported by the first network device;
   generating, based on the slice locator, at least two target slice locators corresponding to the at least two slices;
   generating X forwarding entries based on the at least two target slice locators, wherein X is an integer greater than or equal to 1, and wherein X is less than or equal to a quantity of target slice locators; and
   receiving a slice function from the first network device, wherein the slice function indicates an instruction from the first network device.

7. The SRv6-based data processing method of claim 6, wherein a first format of the slice locator is first type-length-value (TLV), wherein a second format of the target argument is first sub-TLV belonging to the first TLV, and wherein the first sub-TLV indicates a size and a location of the target argument.

8. The SRv6-based data processing method of claim 7, further comprising:
   obtaining slice information from slice topology information based on an indication of the target argument, wherein the slice information comprises a quantity of slices supported by the first network device and identifiers of the slices; and
   generating the at least two target slice locators based on the slice information.

9. The SRv6-based data processing method of claim 7, wherein the second format further comprises a second sub-TLV belonging to the first TLV, wherein the second sub-TLV indicates slice information, wherein the slice information comprises a quantity of slices supported by the first network device and identifiers of the slices, and wherein the SRv6-based data processing method further comprises generating the at least two target slice locators based on the slice information.

10. The SRv6-based data processing method of claim 6, further comprising:
obtaining, from the at least two slices corresponding to the at least two target slice locators, X slices to which the second network device belongs; and
generating the X forwarding entries corresponding to the X slices.

11. A first network device, comprising:
at least one processor;
one or more memories coupled to the at least one processor and storing instructions for execution by the at least one processor, wherein the instructions instruct the at least one processor to cause the first network device to:
generate a slice locator, wherein the slice locator comprises a target argument, wherein the slice locator identifies an addressable destination address prefix in slices supported by the first network device, and wherein the target argument indicates that the slice locator is associated with at least two slices supported by the first network device;
send the slice locator to a second network device; and
send a slice function corresponding to the slice locator to the second network device,
wherein the slice function indicates an instruction set by the first network device.

12. The first network device of claim 11, wherein the target argument comprises slice information, and wherein the slice information comprises a quantity of slices supported by the first network device and identifiers of the slices.

13. The first network device of claim 12, wherein a first format of the slice locator is first type-length-value (TLV), wherein a second format of the target argument is first sub-TLV belonging to the first TLV, and wherein the first sub-TLV indicates a size and a location of the target argument.

14. The first network device of claim 13, wherein the second format is second sub-TLV belonging to the first TLV, and wherein the second sub-TLV indicates the slice information.

15. The first network device of claim 11, wherein the instructions further instruct the at least one processor to cause the first network device to send a physical topology locator to the second network device, wherein the physical topology locator comprises the slice locator, and wherein the physical topology locator identifies an addressable destination address prefix in a physical topology.

16. A second network device, comprising:
at least one processor;
one or more memories coupled to the at least one processor and storing instructions for execution by the at least one processor, wherein the instructions instruct the at least one processor to cause the second network device to:
receive a slice locator from a first network device, wherein the slice locator comprises a target argument, wherein the slice locator identifies an addressable destination address prefix in slices supported by the first network device, and wherein the target argument indicates that the slice locator is associated with at least two slices supported by the first network device;
generate, based on the slice locator, at least two target slice locators corresponding to the at least two slices;
generate, based on the at least two target slice locators, X forwarding entries, wherein X is an integer greater than or equal to 1, and wherein X is less than or equal to a quantity of target slice locators; and
receive a slice function from the first network device, wherein the slice function indicates an instruction from the first network device.

17. The second network device of claim 16, wherein a first format of the slice locator is a first type-length-value (TLV), wherein a second format of the target argument is a first sub-TLV belonging to the first TLV, and wherein the first sub-TLV indicates a size and a location of the target argument.

18. The second network device of claim 17, wherein the instructions further instruct the at least one processor to cause the second network device to:
obtain slice information from slice topology information based on an indication of the target argument, wherein the slice information comprises a quantity of slices supported by the first network device and identifiers of the slices; and
generate the at least two target slice locators based on the slice information.

19. The second network device of claim 17, wherein the second format further comprises a second sub-TLV belonging to the first TLV, wherein the second sub-TLV indicates slice information, wherein the slice information comprises a quantity of slices supported by the first network device and identifiers of the slices, and wherein the instructions further instruct the at least one processor to cause the second network device to generate the at least two target slice locators based on the slice information.

20. The second network device of claim 16, wherein the instructions further instruct the at least one processor to cause the second network device to:
obtain, from the at least two slices corresponding to the at least two target slice locators, X slices to which the second network device belongs; and
generate the X forwarding entries corresponding to the X slices.

21. A Segment Routing over Internet Protocol version 6 (SRv6)-based data processing system, comprising:
a first network device configured to:
generate a slice locator, wherein the slice locator comprises a target argument, wherein the slice locator identifies an addressable destination address prefix in slices supported by the first network device, and wherein the target argument indicates that the slice locator is associated with at least two slices supported by the first network device;
send the slice locator; and
send a slice function corresponding to the slice locator, wherein the slice function indicates an instruction set by the first network device, and
a second network device configured to:
receive the slice locator from the first network device;
receive the slice function from the first network device;
generate, based on the slice locator, at least two target slice locators corresponding to the at least two slices; and
generate, based on the at least two target slice locators, X forwarding entries,
wherein X is an integer greater than or equal to 1, and wherein X is less than or equal to a quantity of target slice locators.

22. The SRv6-based data processing system of claim 21, wherein a first format of the slice locator is first type-length-value (TLV), wherein a second format of the target argument is first sub-TLV belonging to the first TLV, and wherein the first sub-TLV indicates a size and a location of the target argument.

23. The SRv6-based data processing system of claim 22, wherein the first network device is further configured to:
obtain slice information from slice topology information based on an indication of the target argument, wherein the slice information comprises a quantity of slices supported by the first network device and identifiers of the slices; and
generate the at least two target slice locators based on the slice information.

24. The SRv6-based data processing system of claim 22, wherein the second format further comprises a second sub-TLV belonging to the first TLV, wherein the second sub-TLV indicates slice information, wherein the slice information comprises a quantity of slices supported by the first network device and identifiers of the slices, and wherein the first network device is further configured to generate the at least two target slice locators based on the slice information.

25. The SRv6-based data processing system of claim 21, wherein the first network device is further configured to:
obtain, from the at least two slices corresponding to the at least two target slice locators, X slices to which the second network device belongs; and
generate the X forwarding entries corresponding to the X slices.

* * * * *